US006974160B2

(12) United States Patent
Jones

(10) Patent No.: US 6,974,160 B2
(45) Date of Patent: Dec. 13, 2005

(54) SELF RESTRAINING GASKET AND PIPE JOINT

(75) Inventor: Jim Jones, Waco, TX (US)

(73) Assignee: S&B Technical Products, Inc., Forth Worth, TX (US)

( * ) Notice: Subject to any disclaimer, the term of this patent is extended or adjusted under 35 U.S.C. 154(b) by 139 days.

(21) Appl. No.: 10/657,408

(22) Filed: Sep. 8, 2003

(65) Prior Publication Data

US 2004/0232699 A1 Nov. 25, 2004

Related U.S. Application Data

(63) Continuation-in-part of application No. 10/440,809, filed on May 19, 2003.

(51) Int. Cl.[7] .......................... F16L 19/00; F16L 19/08

(52) U.S. Cl. ....................... 285/337; 285/421; 285/339; 285/374; 285/104; 285/910

(58) Field of Search ................................ 285/337, 339, 285/341, 342, 343, 374, 104, 105, 910, 421

(56) References Cited

U.S. PATENT DOCUMENTS 2,585,453 A * 2/1952 Gallagher et al. .......... 285/341
3,381,983 A * 5/1968 Hanes ........................ 285/321
3,963,298 A * 6/1976 Seiler ......................... 277/625
4,848,805 A * 7/1989 Bucher et al. .............. 285/105
4,867,488 A * 9/1989 Jones ......................... 285/328
5,037,144 A * 8/1991 Peting et al. ............... 285/321
5,067,751 A * 11/1991 Walworth et al. ........... 285/105
5,188,401 A * 2/1993 Staniforth ................... 285/322
5,197,768 A * 3/1993 Conner ....................... 285/105
5,295,697 A * 3/1994 Weber et al. ............... 277/616
5,297,826 A * 3/1994 Percebois et al. ........... 285/232
5,431,453 A * 7/1995 Yamashita et al. ............ 285/93
5,464,228 A * 11/1995 Weber et al. ............... 277/615
5,476,290 A * 12/1995 Bergmann et al. .......... 285/110
5,779,285 A * 7/1998 Robison ..................... 285/337
5,803,513 A * 9/1998 Richardson ................. 285/342
5,951,058 A * 9/1999 Dickinson et al. ......... 285/21.2
6,488,319 B2 12/2002 Jones ......................... 285/374
6,502,867 B2 1/2003 Holmes, IV et al. ........ 285/337
6,505,860 B2 * 1/2003 Trichard ..................... 285/104
6,688,652 B2 * 2/2004 Holmes et al. ............. 285/105
2003/0025329 A1 * 2/2003 Saito et al. ................. 285/337

FOREIGN PATENT DOCUMENTS

GB 2272264 A * 5/1994 .......... F16L/37/084

* cited by examiner

*Primary Examiner*—Eric Nicholson
*Assistant Examiner*—James M. Hewitt
(74) *Attorney, Agent, or Firm*—Charles D. Gunter, Jr.

(57) ABSTRACT

A restraining element for preventing separation of a pipe joint used to join a bell end of a female plastic pipe to the male end of a mating pipe. The restraining element is formed from a compressible body of elastomeric material, the compressible body having a segmented metal ring located therein with gripping teeth for engaging an outer surface of the mating male pipe. The ring segments making up the segmented metal ring are oriented such that the gripping teeth of the ring segments are out of contact with and initially angled away from the outer surface of the male plastic pipe. The teeth of the annular gasket are forced into engagement with the exterior surface of the male plastic pipe as the pipe joint is assembled. The teeth are oriented to allow movement of the male pipe in a first direction relative to the female bell end opening during assembly, but to resist movement in a opposite direction after the pipe joint has been assembled.

2 Claims, 3 Drawing Sheets

FIG.3
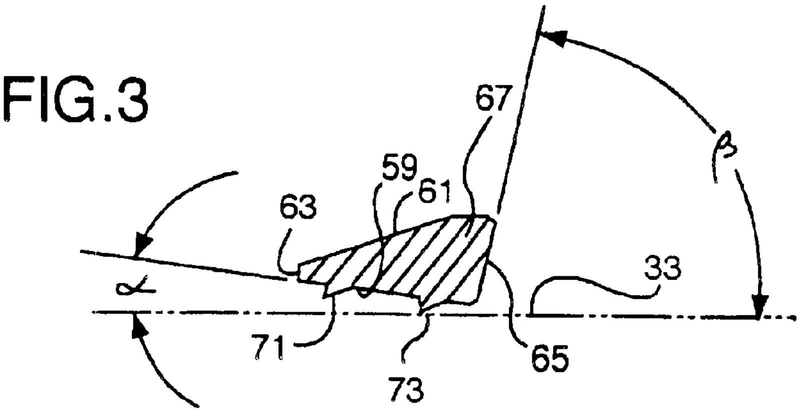
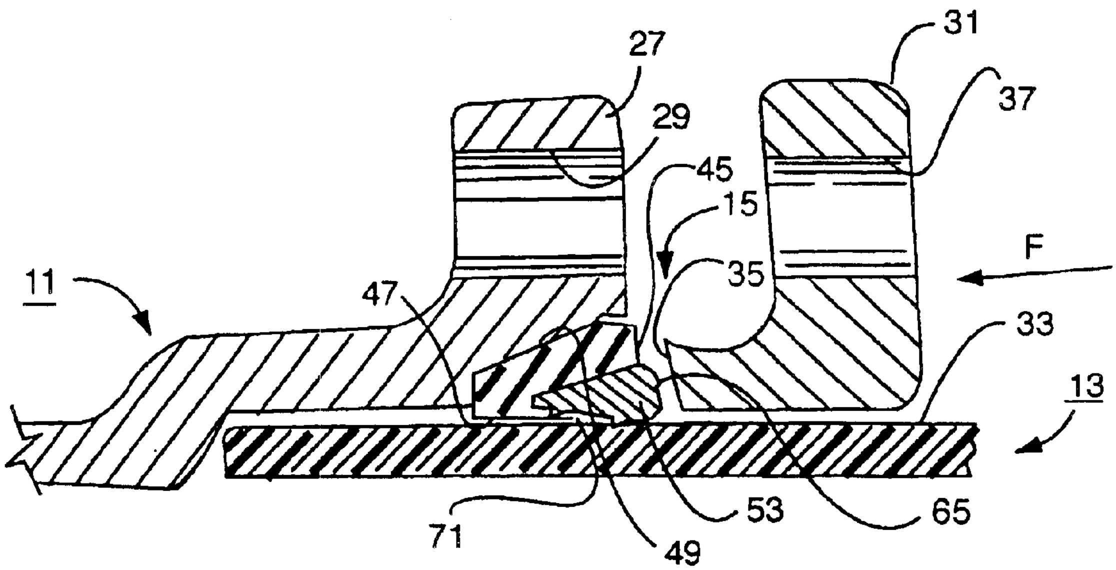
FIG.4
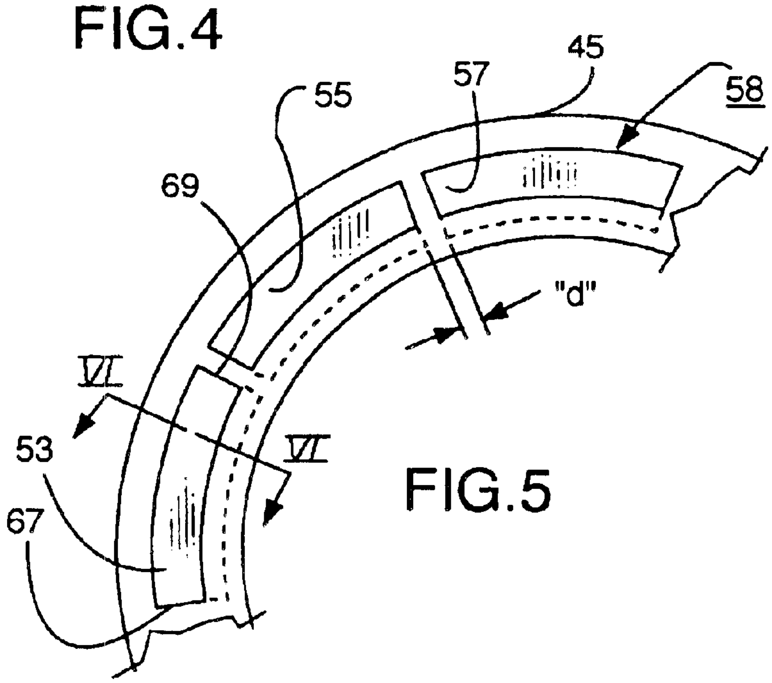
FIG.5

SELF RESTRAINING GASKET AND PIPE JOINT

CROSS-REFERENCE TO RELATED APPLICATIONS

The present application is a continuation-in-part of earlier filed application Ser. No. 10/440,809, filed May 19, 2003.

BACKGROUND OF THE INVENTION

1. Field of the Invention

The present invention relates generally to the field of pipe connections and to devices used in the pipeline construction industry. More particularly, this invention relates to devices used to join the ends of plastic pipe in which a self-restraining pressure gasket is employed.

2. Description of the Prior Art

Pipes are commonly used for the conveyance of fluids under pressure, as in city water lines. They may also be used as free-flowing conduits running partly full, as in drains and sewers. Pipes for conveying water in appreciable quantities have been made of steel, cast iron, concrete, vitrified clay, and most recently, plastic including the various polyolefins and PVC.

In many applications where pipes are joined in telescoping relationship, the spigot end of one pipe is inserted into the socket end of the engaging pipe. The socket end has an opening large enough to receive the spigot end of the mating pipe. Often times, the materials being transported are fluid or gaseous in nature, and, particularly in those circumstances, it is desired that the pipeline be impervious to leaks. In order to accomplish that goal, and to achieve other objectives which will be herein described, those skilled in the business of pipe and pipeline construction are constantly in search of improved means for securing the joints formed by connecting the ends of pipe together. There are numerous methods currently in use by those in the pipe and pipeline construction industry to obtain a secure joint. These methods employ different types of components and also can be distinguished by the various ways in which such components are employed. The selection of these different methods will usually depend on the overall design requirements of the pipeline. In any event, a gasket is typically present within the socket end of the pipe which is intended to prevent leakage of fluid from the joint by forming a seal between the two pipe sections. This method is commonly used in plastic pipelines.

In addition to the necessity of providing an effective seal at the pipe joint, another important design requirement exists when it becomes necessary to join the pipe components in a restrained manner. This is usually desired in order to prevent the pipe components from separating due to thrust forces that often occur when the pipeline is subjected to internal pressure, and sometimes, when earth tremors or other external factors come into play.

In the case of iron pipelines, the devices for joining pipe have included the use of flanged fittings which are of appropriate diameter and which are fitted onto pipe ends in facing relationship to one another. In some cases, a gasket is employed between the faces of the flanged fittings to obtain a sealed joint. This is usually accomplished by bolting the flanged fittings together. In the case of iron pipe, set screws are sometimes inserted radially through the collar of the flange into the exterior surface of the pipe ends in order to secure the flanged fitting to the pipe ends.

A particularly preferred method of forming a sealed joint in the iron pipe industry utilizing a sealing "gland" is sometimes referred to as a "mechanical joint" or simply as an "MJ". The bell end of an iron pipe section has a flanged portion cast on it. The spigot end of a second iron pipe is fitted with a slidable gland fitting and a gasket that is conically shaped such that one face of the gasket is diametrically larger than the second face of the gasket. The conically shaped gasket is positioned between the gland fitting and the spigot end of the pipe with the smaller, second face of the gasket being closer to the spigot end than the larger, first face of the gasket. The gland fitting has a plurality of apertures for receiving standard bolts. The joint is formed when the spigot is axially inserted into the bell, and the gland fitting and the flanged portion are bolted together, causing the lip of the gland fitting to compress the gasket thus sealing the two pipe pieces.

No exact counterpart to the iron pipe mechanical joint (MJ) presently exists in the market place for plastic pipe, however. Nevertheless, it is a generally required practice during installation of plastic pipelines, in, for example, municipal installations, that the pipe joints be restrained to accommodate varying pressures. There are various types of connections which are commercially available and which are used in the waterworks industry for restraining plastic pipelines. Each of these traditional restraining mechanisms adds considerable cost to the pipe installation as well as adding the possibility of human error depending on the specific conditions and applications. Most current restraining systems for plastic pipe systems offered in the industry require a substantial amount of labor to install. Under most installation conditions, the restraining systems are cumbersome to install and represent a substantial additional effort for the contractor.

U.S. Pat. No. 6,488,319, issued Dec. 3, 2002, to Jones, shows a method and apparatus for restraining plastic pipe against internal forces at a connection and to join and seal at least two pipes to form a pipeline where the pipes in question are plastic pipes as opposed to iron pipes. A self-restrained pressure gasket is utilized as a part of the design. The gasket has a continuous rigid ring formed as an integral part of the gasket. The rigid ring which forms the restraining mechanism has rows of teeth of varying lengths that, when assembled, engage at various points around the circumference of a mating pipe. The teeth adjust to the tolerances allowed in pipe manufacturing without losing gripping capacity.

Although the Jones patent represented an advance in the art, it was not intended to represent a mechanical joint for plastic pipe in the same way that the MJ designs have been used in the industry for iron pipe in the past. In other words, the female pipe end in the Jones patent was a typical belled plastic pipe end. There was no sealing gland fitting in the sense of the traditional MJ design, etc.

Accordingly, a needs continues to exist for an improved self restrained gasket and sealing system for a plastic pipeline which offers the advantages of a mechanical joint type sealing system.

A need also exists for such a system which is cost-effective, easy to manufacture and easy to use in the field and which is extremely dependable in operation.

A need also exists for such a system which effectively restrains plastic pipe against internal and external forces at a pipe or fitting connection and which effectively joins and seals at least two pipes to form a pipeline.

SUMMARY OF THE INVENTION

The self-restrained pressure gasket of the invention is intended to be inserted within an annular groove provided in a bell end opening of a female plastic pipe and is capable of both joining and sealing the female plastic pipe to a mating male plastic pipe having an interior surface and an exterior surface. The gasket is formed with an annular gasket body made of a resilient elastomeric material and has an inner circumferential region and an outer circumferential region. A segmented ring which is preferably formed of a plurality of hardened ring segments is integrally molded within the material of the gasket body so that the ring segments are at least partially embedded within the resilient elastomeric material. Each of the ring segments has an inner circumferential surface, an outer circumferential surface, front and rear end faces and opposing sides. At least one row of teeth is located on the inner circumferential surface of at least selected ones of the ring segments for engaging selected points on the exterior surface of the mating male plastic pipe. The ring segments are located within the annular gasket body with the inner circumferential surfaces thereof initially forming an acute angle with respect to the exterior surface of the mating male pipe section. Preferably, a plurality of rows of teeth are located on the inner circumferential surface of at least selected ones of the ring segments. The acute angle which is formed between the inner circumferential surface of the ring segments and the inner circumferential region of the gasket is in the range from about 5 to 20 degrees so that the teeth do not initially engage the exterior surface of the mating male pipe.

The self-restrained gasket of the invention is used to form a pipe joint including a female plastic pipe having a bell end opening with an annual groove for receiving a sealing gasket as previously described. The bell end opening is sized to receive the male spigot end of a mating plastic pipe. The self-restrained pressure gasket is located within the annular groove provided in the bell end opening of the female plastic pipe. The mating plastic pipe is inserted into the bell end opening of the female plastic pipe with the male and female pipes being aligned along a central axis with at least selected teeth of the hardened ring segments being initially angled away from the outer surface of the male plastic pipe. The teeth of the annular gasket are forced into engagement with the exterior surface of the male plastic pipe as the pipe joint is assembled by means of a force applied to the rear end face of the ring segments. This force causes the teeth to be forced downwardly in the direction of the exterior surface of the mating male pipe so that the teeth grip the exterior pipe surface. The teeth are oriented to allow movement of the male pipe in a first direction relative to the female bell end opening during the assembly process but to resist movement in a opposite direction once the pipe joint is made up.

In another embodiment of the invention, the hardened ring is preferably made in one piece with only a single slit along the circumference thereof to allow for expansion and contraction. In this case, the ring preferably rests within a pocket formed in the rubber of the gasket body, thereby allowing some expansion and contraction of the ring, for example, to allow the gasket to slipover the male pipe end.

In yet another embodiment of the invention, the gasket body carries a series of gripping segments exposed at a forward extent thereof. The gripping segments have teeth which are compressed by a gland fitting during the assembly of the pipe joint.

Additional objects, features and advantages will be apparent in the written description which follows.

BRIEF DESCRIPTION OF THE DRAWINGS

FIG. 3 is an isolated, cross sectional view of one of the hardened ring segments used in the self-restraining gasket of the present invention.

FIG. 4 is another horizontal, quarter sectional view of the pipe joint of the invention showing the assembly of the gland fitting which is used to make up the joint and with the gland fitting spaced slightly apart from the self-restraining gasket for ease of illustration.

FIG. 5 is a quarter sectional plan view of the layout of one embodiment of the gripping segments in the self-restraining gasket of the invention showing the gap between the respective gripping segments.

DETAILED DESCRIPTION OF THE INVENTION

Figure 1:
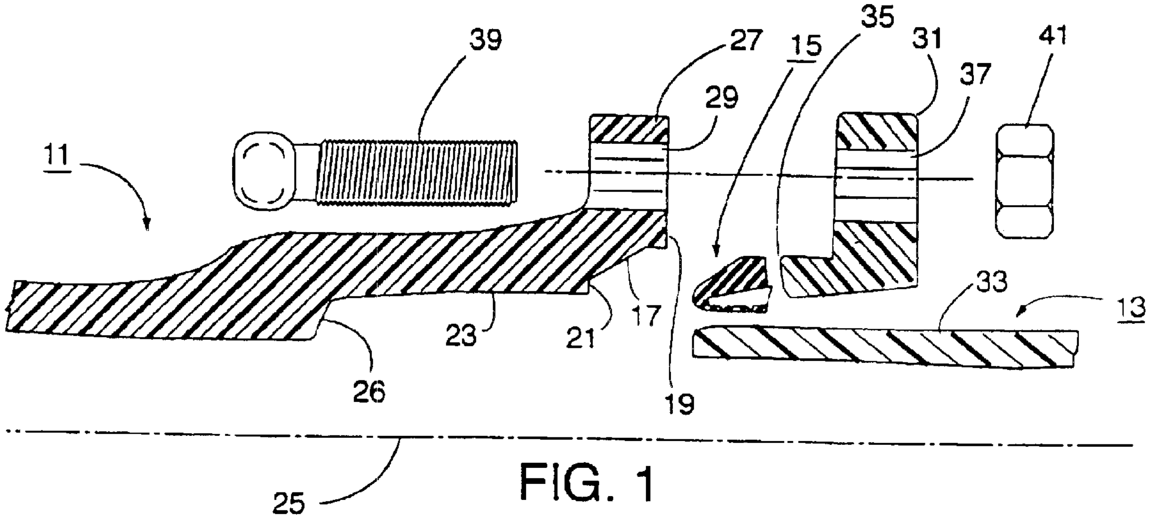
FIG. 1 is a horizontal, quarter sectional view of a pipe joint of the invention, the joint being shown in exploded fashion for ease of illustration.

It is well known in the art to extrude plastic pipes in an elongated cylindrical configuration of a desired diameter and to then cut the extruded product into individual lengths of convenient size suitable for handling, shipping and installing. By "plastic" is meant a section of pipe formed from a convenient polyolefin or polyolefin derivitive such as polypropylene, polyethylene or polyvinylchloride (PVC). The preferred plastic material for purposes of the present invention is PVC. Each length of pipe is enlarged or "belled" at one end sufficiently to join the next adjacent pipe section by receiving in the belled end the unenlarged or "spigot" end of the next adjacent length of pipe within the bell end opening. The inside diameter of the bell is formed sufficiently large to receive the spigot end of the next section of pipe with sufficient clearance to allow the application of an elastomeric gasket or other sealing device designed to prevent leakage at pipe joints when a plurality of pipe lengths are joined to form a pipeline.

Plastic pipes of the above type have, for many years, been joined by utilizing an elastomeric gasket which is compressed between the inside walls of the bell and the outside wall of the plain or beveled end of the spigot end of the next pipe in a series of telescoped pipes. The gasket is typically retained within a groove provided in the bell end opening of the female pipe section. One problem which exists, however, is finding a way to "restrain" the assembled pipe joint so that the joint will not separate due to internal or external pressure, or due to environmental factors such as earth movement.

As mentioned in the background discussion of the invention, the iron pipe industry has addressed the problem of providing a restrained pipe joint by utilizing a sealing "gland" and fitting, sometimes referred to as a "mechanical joint" or simply as an "MJ". The bell end of an iron pipe section has a flanged portion cast on it. The spigot end of a second iron pipe is fitted with a slidable gland fitting and a gasket that is conically shaped. The conically shaped gasket is positioned between the gland fitting and the spigot end of the pipe. The gland fitting has a plurality of apertures for receiving standard bolts. The joint is formed when the spigot is axially inserted into the bell, and the gland fitting and the flanged portion are bolted together, causing the lip of the gland fitting to compress the gasket thus sealing the two sections of pipe.

One object of the present invention is to provide an improved self-restraining gasket which can be used in a variety of sealing situation. In other words, the gasket of the invention might be used in a standard plastic pipe joint to join a belled pipe end to a mating plain end male pipe. Alternatively, the gasket of the invention might be used as the sealing element in a "fitting" which is used to make up a joint between two plain end pipe sections. In a particularly preferred form of the invention, the gasket of the invention is used to make up a mechanical joint in a PVC pipe of the type previously available only in cast iron pipe joints.

Because of the different materials of plastic pipe systems and cast iron pipe systems, the sealing components utilized must be designed differently. The restraining mechanism employed will differ in the plastic pipe system, primarily due to the fact that the plastic pipe can be "scored" or crushed by the restraining mechanism if improper stresses are exerted during the joint assembly or during use. This is not generally a problem in the case of cast iron pipe, because of the difference in material making up the pipe itself.

In the preferred embodiment illustrated in FIG. 1, there is shown a joint is to be formed between a pipe bell end 11 of one pipe and plain spigot end 13 of a second pipe. The second pipe 13 is to be inserted into the belled end 11 of the enclosing pipe. The gasket 15 of the present invention is shown in exploded fashion with the other components of the pipe joint in FIG. 1.

Figure 2:
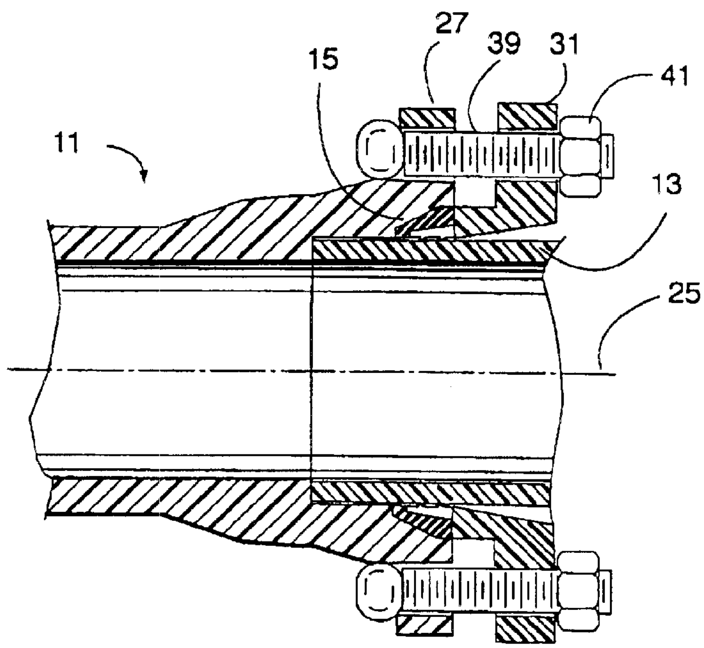
FIG. 2 is again a horizontal sectional view of the pipe joint of the invention, with the joint being shown in the assembled condition.

The inner surface of the pipe bell end 11 has a retainer groove 17 for retaining the gasket 15. The groove 17 is bounded by a front wall 19 and by a retainer wall 21. In addition, the bell pipe end has a throat region 23 which extends longitudinally inwardly parallel to the pipe axis 25 and joins a shoulder region 26. The bell pipe end 11 also has a flanged collar region 27 which includes a plurality of apertures 29. A circumferential gland fitting 31 is sized to be received about an outer surface 33 of the mating male plastic pipe 13. The gland fitting 33 has a forward lip region 35 which contacts and compresses the body of the gasket 15 as the joint is assembled (see FIG. 2). The gland fitting 31 also has a plurality of apertures 37 which are arranged to be aligned with the apertures in the flange collar region 27 of the bell end. A bolting means such as bolts 39 and nuts 41 are used to join the apertures of the bell pipe end and the gland fitting as shown in FIG. 2.

As shown in FIGS. 3–5, the self-restrained pressure gasket 15 includes an annular gasket body 45 made of a resilient elastomeric material, such as a suitable natural or synthetic rubber. The annular gasket body 45 has an inner circumferential region 47 and a sloping outer circumferential region 49. The gasket body 45 is generally cone shaped, as view in cross section in FIG. 4.

Figure 8:
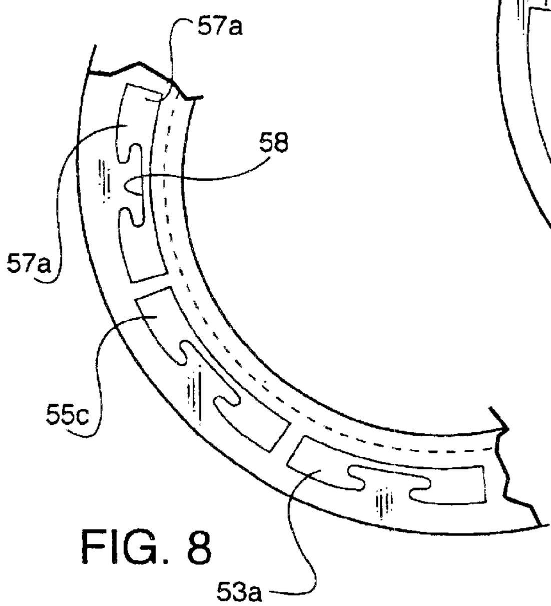
FIG. 8 is a view similar to FIGS. 5 and 7, but showing another embodiment of the hardened ring segments in which the segments are retained in position within the rubber body of the gasket by means of dovetail regions formed in the segments.

A segmented ring (generally at 58 in FIG. 5) formed of a plurality of hardened ring segments (53, 55, 57 shown) is present within the gasket body. Preferably, the segmented ring 57 is integrally molded within the material of the gasket body 45 so that the ring segments 53 are at least partially embedded within the resilient elastomeric material. The ring segments are preferably either bonded to the rubber of the gasket body during the curing or manufacturing process, or are held in place by a suitable adhesive or by other mechanical means. FIG. 8 shows a plurality of ring segments 53*a*, 55*a*, 57*a* which have dovetail regions 58 for mechanically restraining the ring segments within the gasket body.

Figure 6:
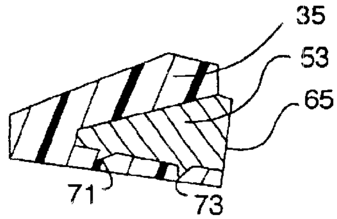
FIG. 6 is an isolated, cross sectional view of the self-restraining gasket of FIG. 5, taken along lines VI—VI.

Each of the ring segments 53, is shown in FIG. 3, has an inner circumferential surface 59, and outer circumferential surface 61, front and rear end faces 63, 65 and opposing sides 67, 69. At least one row of teeth 71 are located on the inner circumferential surface 59 of at least selected ones of the ring segments 53 for engaging selected points on the exterior surface 33 of the mating male plastic pipe 13. In the preferred embodiment illustrated in FIG. 3, the ring segments 53 have two parallel rows 71, 73 of teeth located on the inner circumferential surface 59 of at least selected ones of the ring segments. The rows of teeth 71, 73 may be completely encapsulated within the elastomeric material of the gasket 45 or may be partially exposed therefrom. Preferably, as shown in FIG. 6, the teeth 71, 73 are initially covered by the rubber material of the gasket body. As shown in FIG. 6, the rear end face 65 of the segment 53 protrudes slightly from the resilient elastomeric material 35 of the gasket body in the embodiment illustrated.

The ring segments 53 can be formed of a suitable metal or alloy such as copper, aluminum or stainless steel as well as various hardened polymers, ceramics, composite materials, and the like. Since the gland fitting 31 contacts the ring segments and forms a positive stop for the joint, almost any hard material can be used to form the gripping ring segments 53. Also, the number of rows of teeth and the number of teeth in each row can vary according to the particular end application for the sealing gasket. The rows of teeth on each ring segment can also contain teeth of uneven length which may be spaced evenly or unevenly across the inner circumferential surface 59 thereof.

As illustrated in the embodiment of the invention shown in FIGS. 3 and 4, the ring segments 53 are located within the annular gasket body 45 with the inner circumferential region 59 thereof forming an acute angle $\alpha$ with respect to the exterior surface 33 of the mating male pipe section (illustrated by phantom lines in FIG. 3), or to the pipe axis 25. In the preferred embodiment illustrated, the acute angle $\alpha$ is in the range from about 5° to 20°, most preferably about 7° to 10°. Note also that, in the embodiment illustrated, the rear end face 65 of the ring segment also forms an acute angle $\beta$ in the range of about 65° to 85° with respect to the surface 33. As the gland fitting contacts the gasket, the fitting lip region 35 and the gasket rear end face 65 will form complimentary mating surfaces.

Because of the orientation of the ring segments 53 within the gasket body, the rows of teeth 71, 73 do not engage the pipe exterior surface 33 until the joint is assembled. In other words, some compression of the gasket body 45 is necessary before the teeth 71, 73 are forced to rotate downwardly in the direction of the top arrow over the angle $\alpha$ shown in FIG. 3 and therefore in the direction of the pipe exterior 33. With reference to FIG. 4, as the gland fitting 31 is moved in the direction of the flange collar region 27 of the bell pipe end, the lip region 35 of the gland fitting contacts the rear end face 65 of the segment 53 causing the teeth 71, 73 to be rotated downwardly in the direction of the pipe exterior surface 33. This action causes the rows of teeth 71, 73 to actually protrude through the rubber of the gasket body 45 and bite into the exterior surface of the mating male pipe section 33. Note that in FIG. 4, the gland fitting 31 is shown slightly spaced apart from the flanged collar region 27 for ease of illustration. The ring segment 53 is shown rotated downwardly to contact the male pipe exterior surface 33 as it would be during the initial stage of contact by the gland fitting 31.

As illustrated in FIG. 5, the ring segments (53, 55, 57, illustrated) completely circumscribe the gasket with only a slight gap or distance (illustrated as "d" in FIG. 5) between the segments. This distance is generally as small a gap as is necessary to accommodate installation of the gasket about the mating male pipe section. Some distance between the segments is generally necessary because the gasket body must be stretched slightly in order to fit about the male pipe end. As the joint is assembled and the gland fitting is moved into position, however, the segments move closer together so that the distance "d" decreases, resulting in a nearly complete 360° circumferential contact about the pipe exterior 33. The distance "d" will also vary depending upon the Durometer of the rubber selected for the gasket body 45. The 360° circumferential contact prevents point loading or distortion of the PVC pipe which could scar or damage the pipe.

It will also be apparent to those skilled in the relevant art that the ring segments can be of various lengths with some segments having teeth and others being plain. In any case, it is generally necessary to form a 360° ring on assembly to reduce hoop stress developed dun ng the sealing function of the gasket and joint components. Contact between the ring segments sets up an interference or radial force component so that the device cannot be over tightened.

Figure 7:
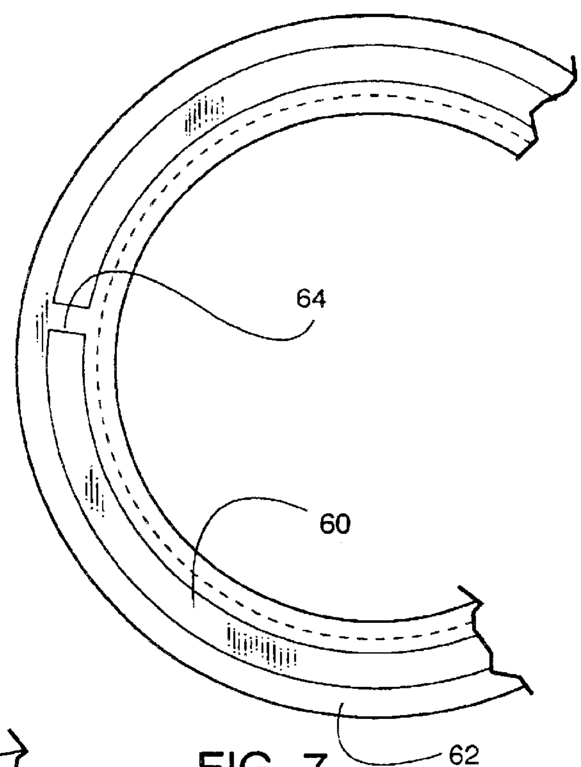
FIG. 7 is a view similar to FIG. 5, but illustrating another embodiment of the invention in which a single ring, slit at one circumferential location, is utilized.

FIG. 7 shows another embodiment of the invention in which a hardened ring 60 is located within the rubber gasket body 62. In this case, the ring 60 is a single piece ring having only a single slit 64 at one circumferential location to allow for expansion and contraction. In this embodiment of the invention, the hardened ring 60 preferably sits within a suitably formed "pocket" in the gasket body. This arrangement allows some movement of the hardened ring 60 within the pocket to allow for expansion and contraction, for example, to allow the gasket to slip over the male pipe end.

While the preferred gasket body is shown in FIGS. 4 and 6 as being conical in cross section, it will be understood that other gasket body shapes can be envisioned such a plain O-ring, or modified O-ring cross section, or even a flanged gasket.

Figure 9:
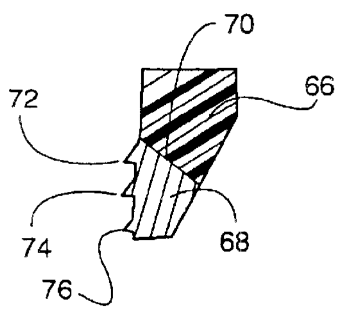
FIG. 9 is an alternative version of the self restrained gasket of the invention in which the gripper segments are exposed on a forward extent of the gasket body.
Figure 10:
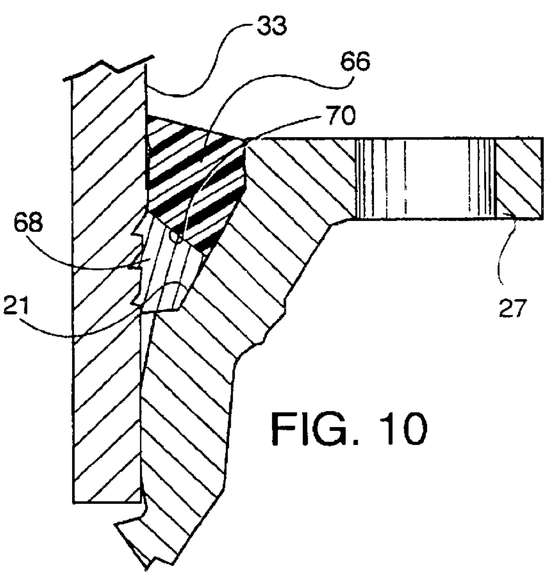
FIG. 10 is a horizontal sectional view of a pipe joint of the invention, with the joint being shown in the assembled condition and utilizing the embodiment of the self-restrained gasket of FIG. 9.

FIG. 9 shows another embodiment of the invention in which the elastomeric gasket body 66 carries a series of gripping segments 68 exposed at a forward extent 70 thereof. The gripping teeth are compressed by a gland fitting during the assembly of the pipe joint, as shown in FIG. 10. The gripping segments 68 may be provided with teeth of the same of different lengths. In the example of FIG. 9, the teeth are of different lengths, as follows:

Row 72-3/32 inch

Row 74-1/16 inch

Row 76-1/32 inch

An invention has been provided with several advantages. The self-restrained pressure gasket of the invention is capable of joining and sealing the female bell pipe end of a plastic pipe to a mating male spigot end of a second plastic pipe. Because the ring segments are either integrally molded within the annular gasket body or otherwise pre-positioned, the possibility of mistakes during field assembly are virtually eliminated. In the case of integrally molded gripping segments, as internal pressure builds, the ring segments supply more pressure to the exterior surface of the mating male spigot pipe end. This action helps to insure the integrity of the joint. Additionally, the hardened ring segments aid in sealing the joint by keeping a constant gripping pressure at even the lowest operating pressure of the pipeline.

The teeth provided on the inner circumferential region of the ring segments are oriented to allow movement of the male spigot end in a first longitudinal direction relative to the female belled end but to resist movement in a opposite longitudinal direction once the joint is assembled. Where the self-restrained pressure gasket is used as a part of a mechanical joint, a self-restrained joint is provided for plastic pipe which equals or exceeds the self-restraining and sealing capabilities of the prior art cast iron pipe systems.

While the invention has been shown in several different forms, it is not thus limited but is susceptible to various changes and modifications without departing from the spirit thereof

I claim:

1. A self-restrained pressure gasket for insertion within an annular groove provided in a bell end opening of a female pipe capable of both joining and sealing the female plastic pipe to a mating male pipe having an interior surface and an exterior surface, the bell end defining an end face at the opening, gasket comprising:

an annular gasket body made of a resilient elastomeric material, the annular gasket body having an inner circumferential region and an outer circumferential region, wherein an end of the gasket body lies substantially at the end face at the opening;

a hardened ring located within the material of the gasket body so that the ring is at least partially embedded within the resilient elastomeric material, the hardened ring having an inner circumferential surface, an outer circumferential surface, front and rear end faces and opposing sides, the hardened ring having a single slit at one circumferential location to allow for expansion and contraction of the ring;

at least one row of teeth located on the inner circumferential surface of the hardened ring for engaging selected points on the exterior surface of the mating male plastic pipe.

2. The self-restrained pressure gasket of claim 1, wherein the hardened ring is located within a pocket provided in the elastomeric material of the gasket body, whereby the hardened ring is allowed limited movement during expansion and contraction of the gasket.

* * * * *